Figure 1:
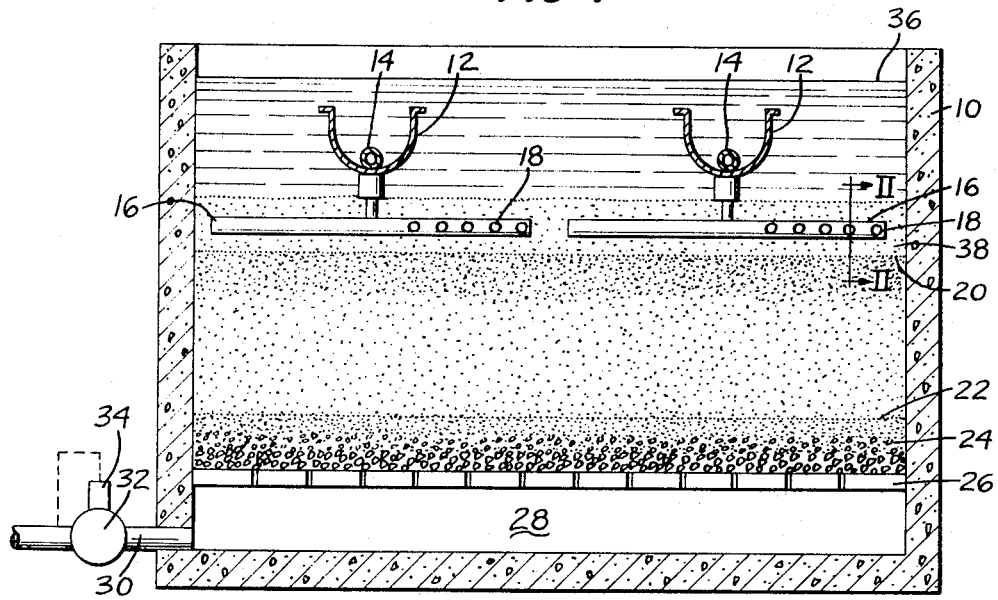

United States Patent

[11] 3,557,961

| [72] | Inventor | Fred E. Stuart, Sr.<br>1157 Belaire Drive, Daytona Beach, Fla. 32020 |
|---|---|---|
| [21] | Appl. No. | 773,044 |
| [22] | Filed | Nov. 4, 1968 |
| [45] | Patented | Jan. 26, 1971 |

[54] SAND FILTER
4 Claims, 2 Drawing Figs.

[52] U.S. Cl................................................... 210/272, 210/273, 210/290
[51] Int. Cl........................................................ B01d 23/16
[50] Field of Search............................................ 210/290, 272, 273, 80

[56] References Cited
UNITED STATES PATENTS
| 2,296,824 | 9/1942 | Ashworth | 210/273X |
| 3,171,801 | 3/1965 | Rice et al. | 210/290X |
| 3,171,802 | 3/1965 | Rice et al. | 210/290X |
| 3,436,260 | 4/1969 | Duff | 210/80X |

*Primary Examiner*—Samih N. Zaharna
*Attorney*—Melvin A. Crosby

ABSTRACT: A method and apparatus for filtering water through a sand bed filter in which a layer of pulverized anthracite coal having a particle size larger than that of the sand particles is placed on top of the sand bed of the filter for the purpose of breaking up the floc in the water being filtered whereby the floc penetrates more deeply into the sand bed resulting in a longer service life for the filter bed before backwashing thereof is required.

PATENTED JAN 26 1971

3,557,961

INVENTOR.
FRED E. STUART SR.

BY

Melvin A. Crosby

SAND FILTER

The present invention relates to an apparatus for filtering and is particularly concerned with an apparatus for filtering water.

The filtering of water in commercial and public water systems is known and is a part of the overall treatment of the water to remove solid impurities and the like therefrom. In particular, water is often treated with agents which create a floc in the water which tends to entrap extremely fine particles which would otherwise be most difficult to filter from the water. The water, after being treated with the aforementioned floc forming agent, is passed through a filter which removes the floc from the water and permits only pure clean water to pass through the filter.

This filtering operation is carried out by passing the water downwardly through a filter bed which ordinarily consists of a layer of sand resting on a layer of gravel and beneath the layer of gravel is a channel to which the clean water is delivered. The flocculating agent added to the water is normally entrapped in the uppermost portion of the sand layer of the filter and penetrates a certain distance into the layer of sand.

After a filter of the nature referred to has been in operation for a certain length of time, the flocculating agent which is entrapped in the upper portion of the sand layer reduces the rate of water flow through the filter to the point that it becomes necessary to clean the filter bed to restore it to adequate filtering capacity. The cleaning of the filter bed is normally accomplished by backflushing the filter by forcing clean water upwardly through the filter bed which will dislodge the floc from the sand and wash it away through an overflow. When the filter bed is cleaned, the backwashing is interrupted, and the flow of water to be filtered through the filter in filtering direction is again initiated.

It has been found that only about the top 4 inches of a layer of sand which is about 30 inches thick is effective for catching the floc and because of this rather small degree of penetration of the floc into the sand bed, the usual filter becomes clogged up in 24 to 36 hours and must be backwashed at that interval in order to restore the filtering capacity thereof to full capacity.

Having the foregoing in mind, it is a primary objective of the present invention to provide an improved filter of the nature referred to which will remain in effective filtering operation for a substantially longer period of time than presently known filter arrangements.

It is also an object of this invention to provide a filtering apparatus which will materially extend the time from one backwashing operation of the filter to the next, while not in any way detracting from the quality of the water received from the filter.

A still further object of this invention is the provision of an apparatus for filtering which is adapted for existing installations as well as new installations.

It is also an object of this invention to provide an apparatus for filtering which will permit substantially higher rates of filtration as well as longer filter runs without in any way diminishing the quality of the water received from the filter.

The foregoing objectives are obtained, in brief, by placing on top of the sand bed in the filter, a layer of crushed and screened anthracite coal which has preferably been treated, as by coating it with a silicone compound or similar agent to produce a smoother surface.

It has been found that a fairly thin layer of this material, say, from 6 to 12 inches thereof, does not retard the flow of water through the filter but has the effect of breaking up the floc in the water so that the floc penetrates more deeply into the following sand bed and is thereby distributed, farther into the sand bed and the filter can remain in operation a substantially longer period of time before the sand bed commences to become clogged up and reduce the rate of water flow through the filter. Further, rotary cleaning agitators are preferably mounted in the filter immersed in the upper anthracite coal layer in order to assist in dislodging the floc and in cleaning the anthracite coal and sand when the filter is backwashed.

Figure 2:
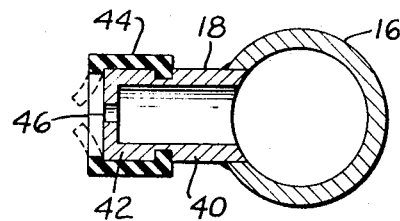

The several objects of the invention referred to above, as well as other objects and advantages thereof, will become more apparent upon reference to the following detailed specification taken in connection with the accompanying drawings in which:

FIG. 1 is a somewhat schematic vertical sectional view through a filter of a basically conventional nature but including an additional uppermost layer of material according to the present invention; and FIG. 2 is a sectional view indicated by line II–II on FIG. 1 and showing a nozzle of one of the agitators which are employed during the backwashing of the filter bed.

Referring to the drawings somewhat more in detail, the filter comprises a tank arrangement 10 of concrete, for example, and extending across the tank near the top, but below the upper edge of the tank are troughs 12. The troughs 12 have pipes 14 extending therealong at the bottom and rotatably suspended from the pipes beneath the troughs and in fluid communication with pipes 14 are the rotary agitators 16. Rotary agitators of the type illustrated are well known and comprise a plurality of jets or nozzles 18 on the two ends of the agitators facing in respectively opposite directions so that when water is supplied under high pressure to pipes 14, this water will pass downwardly into the agitators and jet from the nozzles 18 thereof and cause the agitators to rotate and thereby the filter bed is agitated and simultaneously washed.

At a level 20 beneath the agitators is the upper surface of a sand bed 21 that extends down to a level 22. This sand bed is normally about 30 inches deep in the vertical direction. Immediately below the sand is a gravel bed 24 and beneath the gravel bed is a foraminous support wall 26 which may consist of glazed tile or the like.

Beneath support wall 26 is a chamber 28 which receives the clean filtered water from the filter bed and from which the water flows out of the filter, as by conduit 30, which preferably has a rate controlling valve 32 therein. Valve 32 is under the control of an operator 34 which is sensitive to the rate of flow of water through conduit 30 and which is operable to adjust control valve 32 so as to maintain the rate of water flow from the filter substantially constant. The purpose of control valve 32 is to make certain that water does not flow too rapidly through the filter bed immediately after it has been backwashed and before the floc has commenced to accumulate in the sand bed. As the use of a filter proceeds, control valve 32 will gradually open up until it is wide open and thereafter the rate of water flow through the filter diminishes until at a certain predetermined minimum rate, the filter is taken out of operation and backwashed by a supply of clean water introduced into chamber 28 under pressure so that the water will flow upwardly through the filter bed and dislodge the floc and soil therefrom. During the backwashing operation, the backwash water, together with the dislodged floc and dirt, overflows into troughs 12 and is conveyed therefrom to a place of discharge. During filtering, the water level in the filter is at about the place indicated by line 36 and the troughs 12 at that time are cut off from the place of discharge referred to.

According to the present invention, on top of the sand layer 21 is a layer 38 consisting of pulverized and sized anthracite coal and which coal, furthermore, is preferably treated with a nonwater-soluble coating material such as a silicone compound or a resin in order to produce a relatively smooth surface on the coal particles. The particle size of the anthracite coal in layer 38 is from about 0.90 millimeters to 1.40 millimeters which represents an average overall dimension thereof.

It has been found that only about the top 4 inches of the sand layer, sometimes as much as 6 inches, is effective for entrapping the floc and when this relatively small portion of the sand layer becomes plugged up, the filter has to be taken out of service and backwashed.

I have found that the layer of anthracite coal of the particle size referred to is effective for breaking up the floc before it reaches the sand bed whereby deeper penetration of the floc into the sand bed is had. This apparently comes about because the crushed coal is rather splintery and jagged as opposed to the somewhat more uniform configuration of the sand particles. The jagged structure of the anthracite coal causes it to act somewhat as a roughing filter and some of the floc will be retained on the anthracite coal while that which passes through the anthracite coal tends to be broken up and will penetrate the sand layer a depth of up to 10 or 12 inches. It will be appreciated that, under these circumstances, a filter can remain in service for a substantially longer time before the flow-through rate is so diminished that the possibility presents itself of drawing a negative head in chamber 28. This last-mentioned matter of drawing a negative head in chamber 28 is, of course, to be avoided because of the possibility of blowing up the filter bed with air.

By way of being somewhat more specific to the arrangement of the present invention, the gravel bed might consist of 4 inches of about 1½ inch gravel on the bottom tile, then 4 inches of 1-inch gravel and then 4 inches of pea gravel or torpedo sand. This grading of the gravel prevents the sand from being washed downwardly through the filter into chamber 28. The particle size of the sand layer, which is about 30 inches deep, is from about 0.40 to 0.55 millimeters and, as has been mentioned, the particle size of the crushed anthracite coal layer which it is preferred to use according to the present invention is on the order of 0.90 millimeters to about 1.40 millimeters and these particles are irregular and jagged.

The thickness of the anthracite coal layer is from about 6 to 12 inches deep and the rotary agitators are mounted in the layer of anthracite coal and about 2 inches above the upper surface 20 of the sand layer 21.

When filtering is in process, the bed of the filter appears about like it is shown in FIG. 1. However, when the filter is backwashed, the upward flow of water through the filter bed tends to raise the upper level of the sand layer to above agitators so that the upper portion of the sand layer is thoroughly scored by the jets from the rotary agitators.

Even though the filter bed is lifted up and loosened by the backwashing water flowing therethrough, the anthracite coal layer will remain on top of the sand because the coal layer weighs only about 55 pounds per cubic foot whereas the sand is much heavier, weighing about 95 pounds per cubic foot.

In filtering, it is desired to pass water through the filter but at a rate of not substantially less than about 2 gallons per square foot per minute. The rate control valve 32 is effective for maintaining this rate substantially constant through out the service time of the filter.

Where the conditions of use of the water will permit, it has been found that a flow rate of up to 3 to 4 gallons per square foot per minute can be passed through a filter bed arranged according to the present invention without any decrease in the quality of the filtered water and without any damage to the filter bed.

During backwashing the rate of water flow upwardly through the filter bed is about 6 gallons per square foot per minute in order thoroughly to clean and scour the filter bed.

From the foregoing it will be seen that the present invention relates to a method and apparatus for filtering water in which the net result is longer service time for the filter and higher possible rates of filtration but with no diminution of the quality of the filtered water withdrawn from the filter.

FIG. 2 illustrates one type of nozzle which could be employed on the rotary agitator. In FIG. 2 it will be noted that the agitator arm 16 is in the form of a pipe while the nozzle or jet 18 is in the form of a short length of pipe 40 projecting laterally from pipe 16 and having a blocklike member 42 on the end. A rubberlike cap 44 having one or more transverse slits 46 in the center thereof is mounted on member 42. By the arrangement illustrated, water under pressure can pass from pipe 16 through pipe 18 and out through member 42 and the slits in the cap 44. However, when the high-pressure supply of liquid to the agitators is shut off, the rubberlike cap 44 will fold back down against the end of the blocklike member 42 and prevent any water or sand or the like from getting back into the passage through the agitator. The position of the left end of rubberlike cap 44 when water is flowing out of the agitator is shown in dotted outline in FIG. 2 whereas the position occupied by the left end of the rubberlike cap when the water supply through the agitator is cut off is shown in full lines.

It will be understood that this invention is susceptible to modification in order to adapt it to different usages and conditions; and accordingly, it is desired to comprehend such modifications within this invention as may fall within the scope of the appended claims.

I claim:

1. In a filter for a water treatment installation: a filter bed through which water flows downwardly during filtering and comprising an upper sand layer, and a layer of irregular jagged particles resting on top of the sand layer and of substantially smaller depth than said sand layer and operable to break up floc in the water to be filtered so as to permit deeper penetration of the floc into the layer of sand and a correspondingly longer period of time between backwashing cycles of the filter bed, said material having a materially smaller specific gravity than that of the sand of the sand layer, said particles having a smooth surface coating thereon, agitator means for use during backwashing of the filter bed, said agitator means comprising horizontal pipe means in a plane beneath the top of said layer of particles and above the top of said sand layer and having laterally directed nozzle means thereon, and means supporting said agitator means for rotation on a vertical axis.

2. A filter according to claim 1 in which said surface coating comprises a water insoluble material selected from the class consisting of: silicone compounds and polyethelene sprays.

3. A filter according to claim 1 in which said particles are anthracite coal.

4. A filter according to claim 1 in which said particles have an average cross-sectional dimension of about 0.90 to 1.40 millimeters.